W. H. SAUVAGE.
FLUID PRESSURE BRAKE SYSTEM.
APPLICATION FILED JULY 19, 1910.

1,088,299.

Patented Feb. 24, 1914.

W. H. SAUVAGE.
FLUID PRESSURE BRAKE SYSTEM.
APPLICATION FILED JULY 19, 1910.

1,088,299.

Patented Feb. 24, 1914.

W. H. SAUVAGE.
FLUID PRESSURE BRAKE SYSTEM.
APPLICATION FILED JULY 19, 1910.

1,088,299.

Patented Feb. 24, 1914.
7 SHEETS—SHEET 3.

Attest:

Inventor:
William H. Sauvage
by Redding, Greeley & Austin
Attys.

W. H. SAUVAGE.
FLUID PRESSURE BRAKE SYSTEM.
APPLICATION FILED JULY 19, 1910.

1,088,299.

Patented Feb. 24, 1914.
7 SHEETS—SHEET 4.

Fig. 5.

Attest:

Inventor:
William H. Sauvage
by Redding, Greeley & Austin
Attys.

W. H. SAUVAGE.
FLUID PRESSURE BRAKE SYSTEM.
APPLICATION FILED JULY 19, 1910.

1,088,299.

Patented Feb. 24, 1914
7 SHEETS—SHEET 5.

Attest:

Inventor:
William H Sauvage
by Redding, Greeley & Austin
Attys.

W. H. SAUVAGE.
FLUID PRESSURE BRAKE SYSTEM.
APPLICATION FILED JULY 19, 1910.

1,088,299.

Patented Feb. 24, 1914.

Attest:

Inventor:
William H. Sauvage
By Redding, Greeley & Austin
Attys.

UNITED STATES PATENT OFFICE.

WILLIAM H. SAUVAGE, OF NEW YORK, N. Y.

FLUID-PRESSURE BRAKE SYSTEM.

1,088,299.

Specification of Letters Patent.   Patented Feb. 24, 1914.

Application filed July 19, 1910.   Serial No. 572,768.

*To all whom it may concern:*

Be it known that I, WILLIAM H. SAUVAGE, a citizen of the United States, residing in the borough of Manhattan of the city of New York, in the State of New York, have invented certain new and useful Improvements in Fluid-Pressure Brake Systems, of which the following is a specification, reference being had to the accompanying drawings, forming a part hereof.

This invention has for its main objects, first, to provide means for automatically maintaining pressure in the train pipe, which pressure shall be also under the control of the engineer and variable at his will; and second, to provide improved means for maintaining in the brake cylinders, at the will of the engineer, a known pressure, such pressure being dependent upon the train pipe pressure which itself is known to and under the control of the engineer.

Various other objects, more or less incidental to these two main objects, will more clearly appear hereinafter with reference to the accompanying drawings in which is illustrated a convenient and practical embodiment of the invention by which the several objects are attained, together with a modified form thereof.

In the drawings Figs. 2 and 3 are detail views, in section, and on a larger scale, of the improved automatic pressure controlling or equalizing valve which forms a part of the engine equipment, the parts thereof being shown in different positions in the two views. Fig. 3ª is a detail view showing the reduction valve in a different position.

Figure 1:
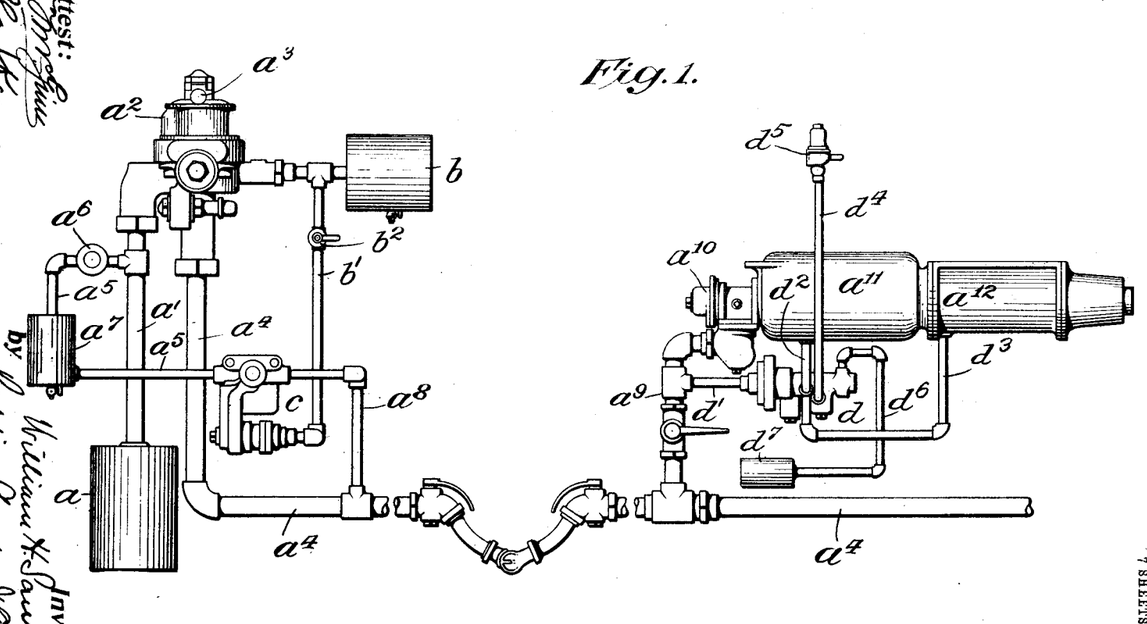
—Figure 1 is a partly diagrammatic or outline view showing so much of the engine equipment and the car equipment of a fluid pressure brake system as is necessary to enable the application of my invention thereto to be understood.

In the arrangement represented in Fig. 1, of the drawings, the main reservoir $a$ or other usual source of air under pressure is shown as connected by a suitable pipe $a'$ with the engineer's valve $a^2$, which may be of any usual or suitable construction, being shown as provided with the usual controlling handle $a^3$ and thence with the train pipe $a^4$, which, provided with the usual fittings and connections for the several cars, extends throughout the train. Connected with the main reservoir $a$ through the engineer's valve $a^2$ and located on the engine is an equalizing reservoir $b$, which is also connected by a pipe $b'$, provided with a suitable stop cock $b^2$, with the improved automatic pressure controlling or equalizing valve $c$, as more fully explained hereinafter. Connection is also made from the main reservoir or other source of supply to the valve $c$ by a pipe $a^5$ having therein a reducing valve $a^6$ and a supplemental reservoir $a^7$, and from the valve $c$ to the train pipe $a^4$ by a branch pipe $a^8$. In the preferred arrangement of the car equipment, as shown in the right hand portion of Fig. 1, the train pipe $a^4$ is connected by a branch $a^9$ with the usual triple valve $a^{10}$, with the usual auxiliary reservoir $a^{11}$ and brake cylinder $a^{12}$. In this arrangement the auxiliary controlling or automatic pressure maintaining valve $d$ is connected, as at $d'$, with the branch $a^9$ of the train pipe $a^4$, as at $d^2$, with the auxiliary reservoir $a^{11}$, as at $d^3$, with the brake cylinder, as at $d^4$, with the usual retaining valve $d^5$, if the same is used, and as at $d^6$, with a supplemental reservoir $d^7$. The connection from the main reservoir through the reducing valve $a^6$ and thence to the car equipment serves a particularly useful purpose in connection with the improved car equipment, regardless of the improved automatic controlling or equalizing valve $c$, as will be explained more fully in connection with the description of the car equipment.

Figures 2, 3, 3A:
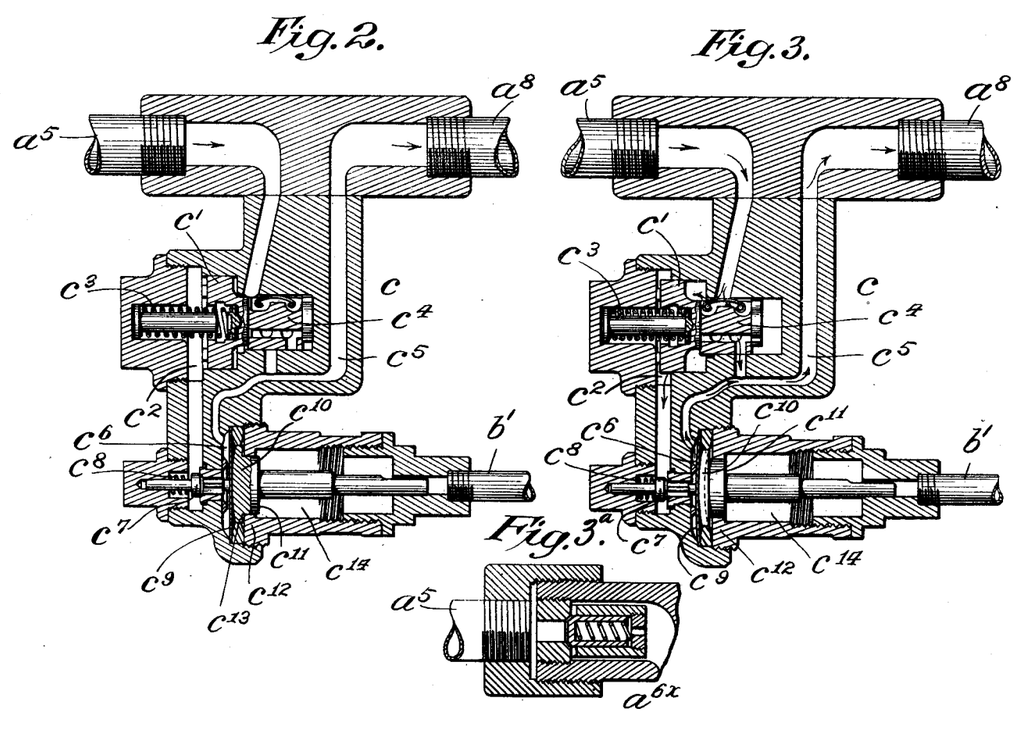

The supplemental reservoir $a^7$ is included in the connection through the reducing valve $a^6$ in order to obtain the advantages of a substantial volume of air as a cushion and reservoir, and may be of any suitable size. The reducing valve might be applied directly to the controlling valve $c$, as shown in Fig. 3$^a$. The equalizing reservoir $b$ is connected with the controlling valve that the air pressure in the reservoir may act upon the valve as hereinafter explained. It may be cut off from the valve so as to render the same inoperative by the cock $b^2$.

Figures 9, 10, 11, 12:
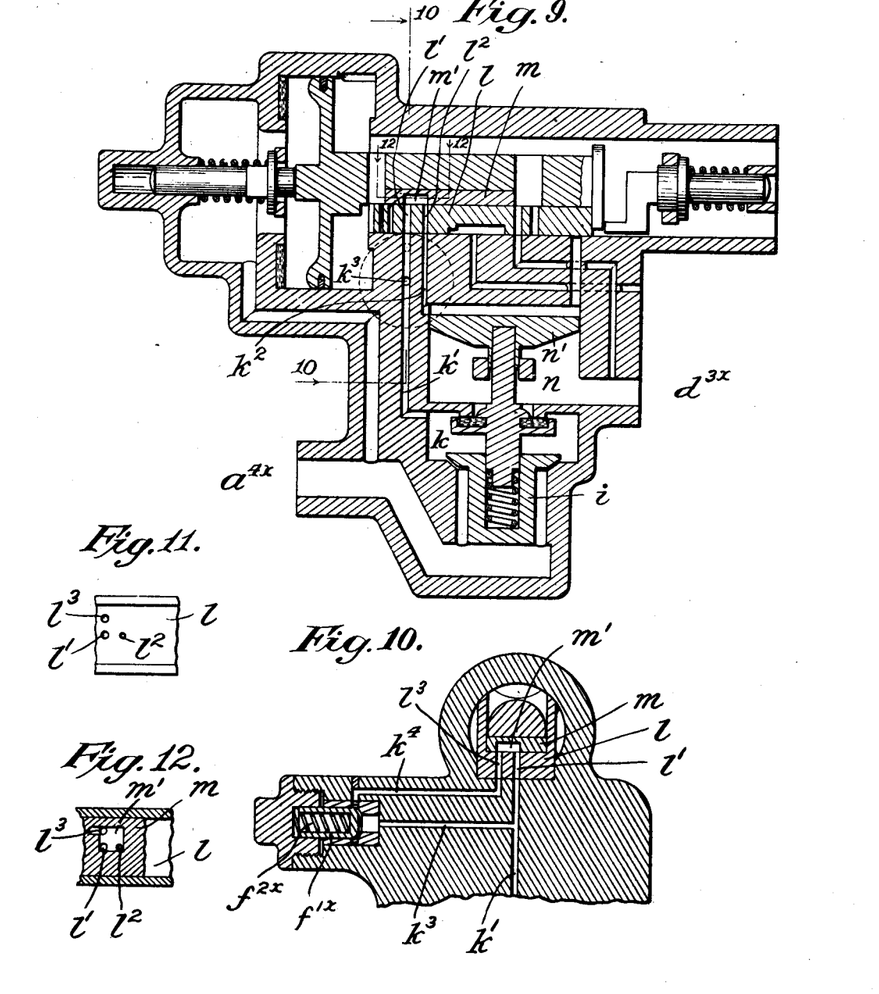
Fig. 9 is a detail view in section of a modification of the auxiliary control or automatic pressure maintaining valve, shown as incorporated in the structure of the usual triple valve.
Fig. 10 is a detail view in section on the plane indicated by the line 10—10 of Fig. 9, looking in the direction of the arrows.
Figs. 11 and 12 show the relation of the parts involved in the operation of the modification shown in Figs. 9 and 10.

The automatic pressure controlling or equalizing valve $c$, shown in detail in Figs. 2 and 3, is for the most part similar in construction, operation and function to the usual feed valve generally used in fluid pressure brake systems, but is modified in construction and is connected with the equalizing reservoir $b$ for the purpose of securing certain improved results as hereinafter described. It comprises, as usual, a piston $c'$ which is subject on one side to the pressure in the main reservoir, modified, in the improved construction, by the reducing valve $a^6$, and on the other side to the back pressure in the channel $c^2$ behind it and to the action of a spring $c^3$, the piston $c'$ carrying a slide valve $c^4$ which controls communication between the main reservoir through the pipe $a^5$ and the train pipe through the branch $a^8$. The channel $c^5$, to which air under pressure is admitted through the valve $c^4$, also communicates as usual with a diaphragm chamber $c^6$ and the latter communicates, also as usual, with the channel $c^2$ through a check or regulating valve $c^7$. The diaphragm $c^9$ is supported as usual by a piston backing $c^{10}$ with a guide hub $c^{11}$ which fits loosely in the guide bearing $c^{12}$. In feed valves of this character, as heretofore constructed, the piston backing $c^{10}$ is flat on its rear or right hand face and, when the valve is closed, stands clear of the guide bearing $c^{12}$ behind it, but in the improved construction, in order that the diaphragm may be better supported, the piston backing $c^{10}$ is extended so that it rests against the guide bearing $c^{12}$ when the valve is closed and in order that the air pressure which, in the improved construction, is arranged to act upon the rear or right hand side of the diaphragm and its piston backing, instead of the usual spring, may have the full area of the piston backing to act upon, finding its way between the guide hub $c^{11}$ and the bearing, the rear or right hand face of the piston backing is dished, as at $c^{13}$, so that such piston backing rests, at its periphery only, against the guide bearing $c^{12}$, while its full area, within its periphery, is subject to the air pressure. In the feed valve, as usually constructed, a spring is placed in the chamber $c^{14}$, behind the diaphragm and its piston backing and acts when the pressure in the train pipe and against the left hand side of the diaphragm is reduced to unseat the check or regulating valve $c^7$ and, thereby relieving the pressure behind or on the left hand face of the piston $c'$, to permit the piston $c'$ to move under the pressure from the main reservoir to open the valve $c^4$ and admit air under pressure from the main reservoir to the train pipe to build up the pressure in the train pipe until it is sufficient to overcome the resistance of the spring. The spring $c^3$ returns the piston $c'$ to its right hand position closing the valve $c^4$ and shutting off communication between the main reservoir and the train pipe and at the same time the pressure on the left hand face of the diaphragm $c^9$ is increased so that the diaphragm is moved to the right, compressing the usual spring and the check valve $c^7$ is permitted to seat itself thereby shutting off communication between the channel $c^2$ and the channel $c^5$ until pressure in the train pipe again falls. Since, in such old construction, the valve $c^7$ is acted upon by a spring, the force of which remains unchanged after adjustment, the pressure in the train pipe is dependent upon the tension of the spring and cannot be controlled by the engineer. One object of the present invention, as already pointed out, is to enable the engineer to control the pressure in the train pipe while at the same time provision is made for the automatic maintaining of the pressure in the train pipe to the degree determined by the engineer. For this purpose the usual spring $c^8$ behind the diaphragm is replaced by air supplied from the equalizing reservoir $b$ through the pipe $b'$ to the chamber $c^{14}$. As the pressure in the equalizing reservoir $b$ is always under the control of the engineer, the pressure in the chamber $c^{14}$, behind the diaphragm $c^9$, is also always under the control of the engineer, so that the degree of pressure at which the diaphragm $c^9$ is thrown forward or to the left, to unseat the valve $c^7$, can always be regulated by the engineer and consequently the pressure in the train pipe can always be determined by the engineer. The improved feed valve or automatic pressure controlling or equalizing valve, as will be observed, is a differential valve, depending for its operation upon the differential of pressures in the equalizing reservoir $b$ and in the train pipe and being very delicate and sensitive in its operation the train pipe pressure is practically equal or nearly equal to that in the equalizing reservoir $b$, which is always under the control of the engineer. So far, therefore, as the invention relates to the engine equipment it has been seen that it depends mainly upon the provision of means whereby the pressure in the train pipe is built up automatically from a pressure reservoir wherein the pressure is under the control of the engineer, such means consisting of a valve governing the communication between the main pressure reservoir and the train pipe and itself controlled by the differential of the pressures in the equalizing reservoir and the train pipe. So far as the invention relates to the car equipment it will be seen hereinafter that it depends mainly upon the provision of a differential valve introduced between the train pipe and the brake cylinder whereby a pressure may be maintained in the brake cylinder less than that in the train pipe by the degree determined by the differential valve, whereby, since the pressure in the train pipe may be determined by the engineer, as already explained, the pressure in the brake cylinder may also be determined by the engineer. Of course it will be understood that suitable controlling devices are provided in connection with such a differential valve. Such controlling devices may consist of the usual parts of the usual triple valve, with which the differential valve may be incorporated directly, as shown in Figs. 9 and 10 and explained hereinafter, but it is preferably embodied in a structure independent of the usual triple valve, as shown in Figs. 4-6 and 8 and explained hereinafter, because additional functions are thereby secured, and because it can be applied readily to existing brake systems without requiring modification of the usual construction of the triple valve.

Figures 4, 7:
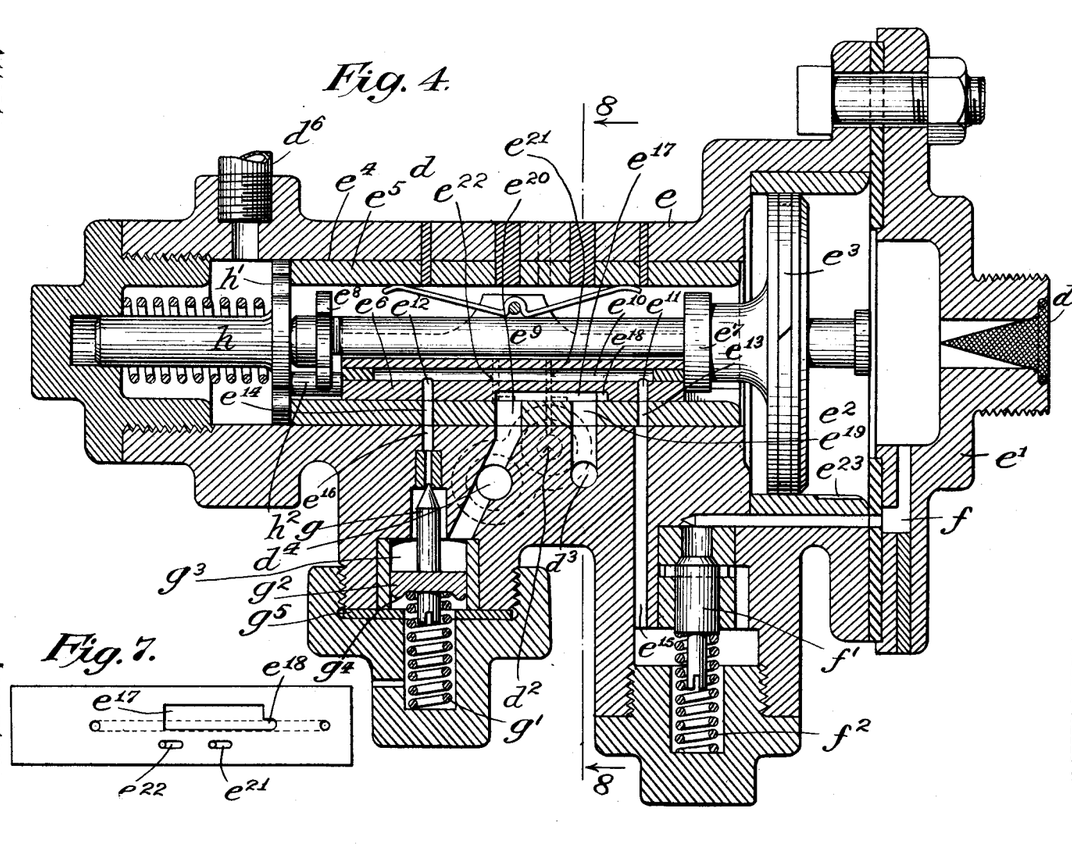
Figs. 4, 5 and 6 are detail views in section and on a larger scale of the auxiliary control or automatic pressure maintaining valve, which forms a part of the car equipment, the parts thereof being shown in different positions in the several views.
Fig. 7 is a detail view of the working surface of the slide valve.
Figure 5:
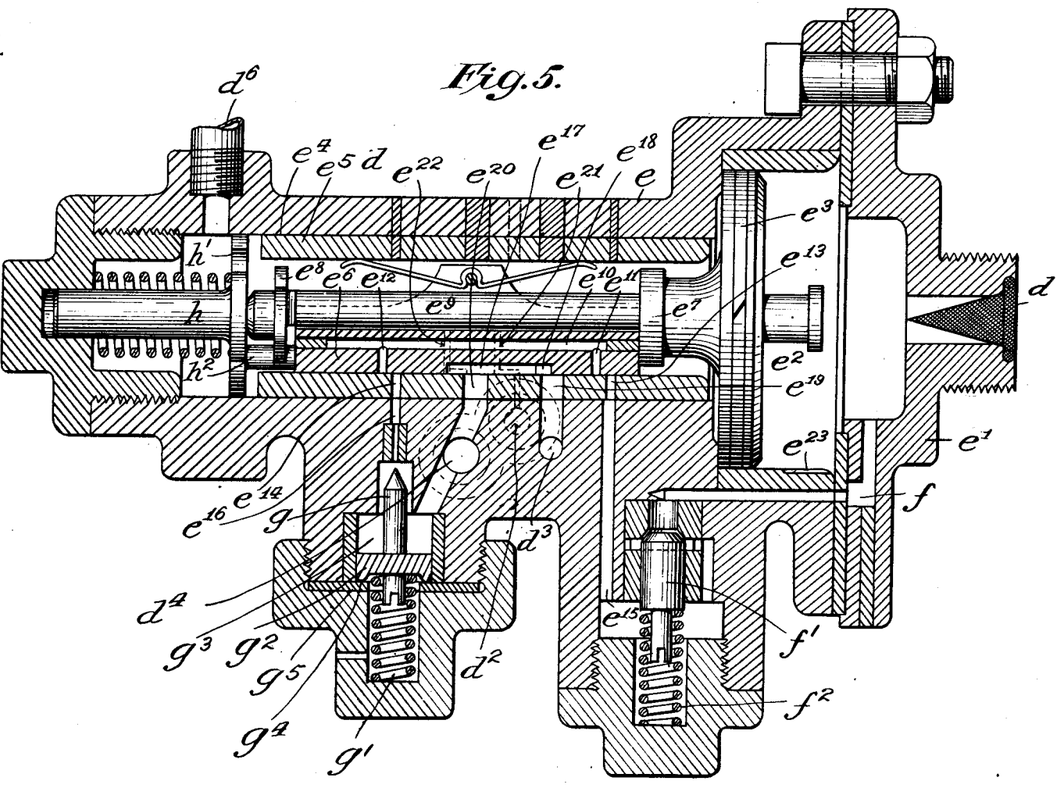
Figure 6:
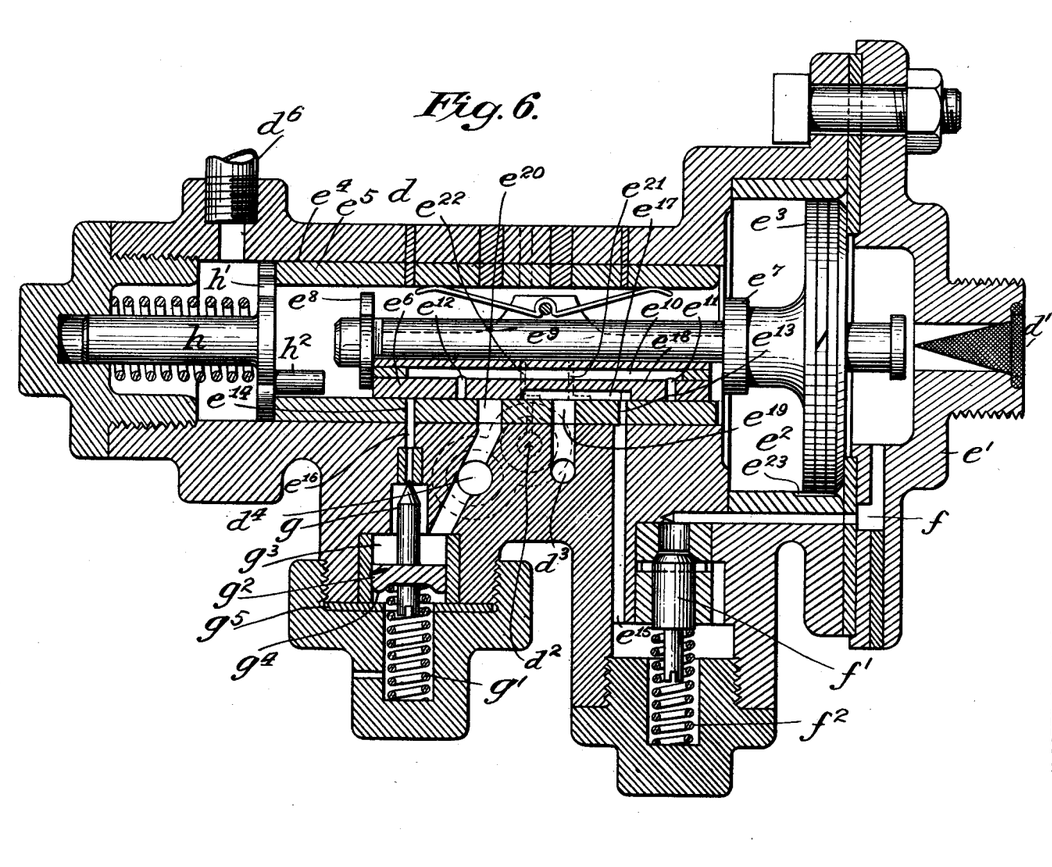
Figure 8:
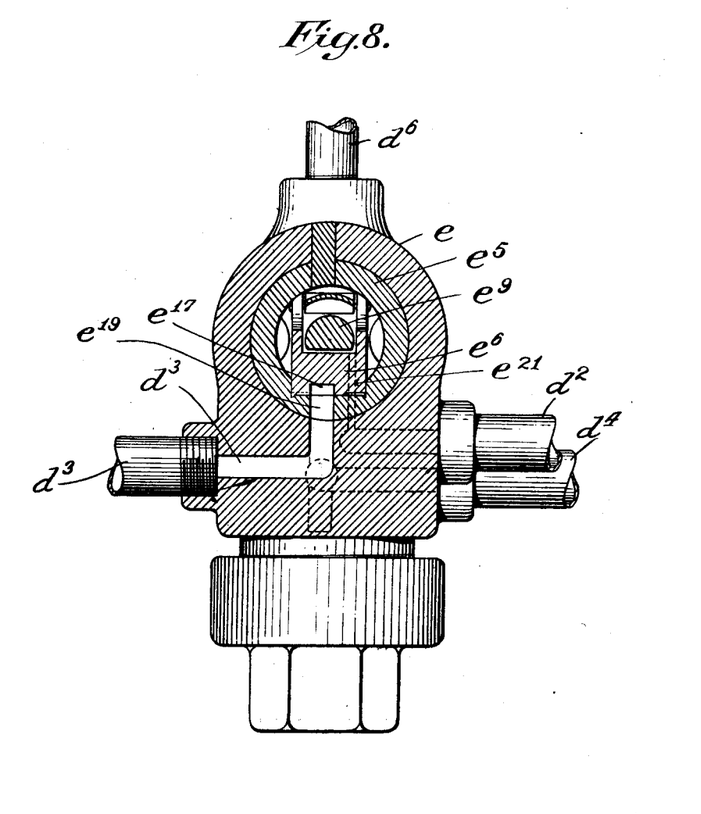
Fig. 8 is a view in section on the plane indicated by the line 8—8 of Fig. 4, looking in the direction of the arrows.

The improved auxiliary controlling or automatic pressure maintaining and accelerating valve, comprising the differential valve above mentioned and its coöperating parts, is shown in Fig. 4, with its parts in normal release position; in Fig. 5 with its parts in restricted release position and in Fig. 6 with its parts in service position. As shown in these figures and in Fig. 8, this valve or device, as it may be called, since it includes several valves, comprises a suitable shell or body $e$ with a cap $e'$ through which connection with the train pipe is established, as indicated at $d'$ and $a^9$ in Fig. 1. The body is chambered, as at $e^2$, to receive a piston $e^3$, and is also chambered, as at $e^4$, to receive a slide valve bushing $e^5$, within which is mounted a slide valve $e^6$. The latter is shifted by shoulders $e^7$ and $e^8$ on the stem $e^9$ of the piston $e^3$, the length of the slide valve $e^6$ being slightly less than the distance between the shoulders $e^7$ and $e^8$ so that the piston may acquire momentum before the valve is shifted and thereby overcome any tendency of the valve to stick on its bearing surface. The slide valve is provided with a longitudinal channel $e^{10}$, a port $e^{11}$ near one end thereof and a port $e^{12}$ near the other end thereof, adapted to register respectively, when the slide valve is in normal release position, with ports $e^{13}$ and $e^{14}$ in the slide valve bushing $e^5$ and with channels $e^{15}$ and $e^{16}$ respectively in the body $e$. The slide valve is also provided on its under or working surface with a recess $e^{17}$ which is substantially rectangular but has at one end a narrow extension $e^{18}$. The recess $e^{17}$ is adapted to establish communication between ports $e^{19}$ and $e^{20}$ in the slide valve bushing $e^5$, the former of which communicates through a channel in the body $e$ with the brake cylinder through the connection $d^3$, while the latter communicates with the atmosphere through the connection $d^4$ and the retaining valve $d^5$, if the latter be used, or directly if no retaining valve be used. When the slide valve is in normal release position, as shown in Fig. 4, the area of the ports $e^{19}$ and $e^{20}$ is unrestricted, but when the slide valve is in restricted release position, as shown in Fig. 5, the narrow extension $e^{18}$ of the recess $e^{17}$ overlaps the port $e^{19}$ and the passage of air is therefore restricted. The slide valve $e^6$ is also provided with channels $e^{21}$ and $e^{22}$, each of which is somewhat elongated at the working surface of the slide valve. The channel $e^{21}$ establishes communication through the slide valve and through the bore of the bushing $e^5$ between the auxiliary reservoir $a^{11}$ and its connection $d^2$ on the one hand and the supplemental reservoir $d^7$ and its connection $d^6$ on the other hand, when the parts are in restricted release position, as shown in Fig. 5, and therefore equalizes the pressure in these reservoirs at such time. The port or channel $e^{22}$, on the other hand, when the parts are in service position, establishes communication between the same two reservoirs and equalizes the pressure therein. From the chamber $e^2$, on the train pipe side of the piston $e^3$, communication is established with the channel $e^{15}$ above mentioned, through a channel $f$, the communication being controlled by a valve $f'$ which is held to its seat, against the train pipe pressure, by a spring $f^2$ and by the air pressure against the other end of the valve, the air pressure against such other end of the valve being the brake cylinder pressure as hereinafter explained. It is important to distinguish this differential valve, which opens whenever the differential of pressure between the pressures in the train pipe and the brake cylinder exceeds the tension of the spring $f^2$, from a simple reducing valve, which is held to its seat by the pressure in the brake cylinder and is forced from its seat by a spring whenever the pressure in the brake cylinder falls below a predetermined degree. In the latter case it is impossible to admit more than a predetermined pressure to the brake cylinder, while in the former case, the valve opens whenever the pressure differential exceeds the spring pressure, and the pressure which may be admitted to the brake cylinder therefore depends wholly upon the pressure in the train pipe, and is high or low as the pressure in the train pipe is high or low. Since the pressure in the train pipe, as already explained, is under the control of the engineer, the pressure in the brake cylinder is also under the control of the engineer. Furthermore, the differential valve may act as an accelerating valve, to permit pressure in the train pipe to be reduced by passage into the brake cylinder, provided only that the differential of pressure is sufficiently great, while the reducing valve cannot act as such an accelerating valve unless the pressure in the brake cylinder is below the predetermined normal, no matter what the pressure in the train pipe may be. The passage of air from the train pipe through the channel $f$ and past the differential valve $f'$ is through the channel $e^{15}$ in the body or shell $e$, the channel $e^{10}$ in the slide valve, the channel $c^{16}$ in the body $e$, the port $e^{20}$, the chamber or recess $e^{17}$ in the slide valve and the port $e^{19}$ to the brake cylinder through the connection $d^3$, but the passage of air through this path is normally prevented when the retaining valve $d^5$ is open, by a needle valve $g$ which is interposed in the channel of communication and is held normally to its seat by a spring $g'$. A piston $g^2$ on the needle valve $g$ travels in a chamber $g^3$ which forms a part of the channel of communication and is subject therein to the back pressure from the exhaust of the brake cylinder when the retaining valve $d^5$ is closed. Such back pressure forces the valve $g$ from its seat, as shown, for example, in Fig. 5, and permits the train pipe pressure to be admitted through the described channel and past the needle valve into the brake cylinder when the slide valve is in normal position, as shown in Fig. 4. In order that there may be no leakage past the piston $g^2$ the latter is provided on its underside with a bearing ring $g^4$ which rests, when the piston is forced down, against a gasket $g^5$ to make a tight closure. It will be understood, of course, that so long as the usual retaining valve is open (when the triple valve is in release or recharging position), the improved device is inoperative through the absence of the back pressure which is required to open the needle valve $g$. Hence it is that when the differential valve is embodied in a structure independent of the usual triple valve, the usual exhaust of the triple valve is plugged and the retaining valve is connected to the exhaust of the auxiliary valve or device. Furthermore it will be seen that since the exhaust is through the auxiliary valve or device, which becomes operative through the closing of the retaining valve, the auxiliary valve or device is operative independently of the triple valve and will act even should the usual triple valve fail to act.

In the wall of the chamber $e^5$, in its inward or right hand portion, is formed a leakage groove $e^{23}$, the purpose of which is to prevent effective movement of the piston $e^3$ from service position, as shown in Fig. 6, should it have any tendency to move by reason of leakage, for should the piston $e^3$ start slightly from the service position, shown in Fig. 6, so as to permit air to pass between it and its seat, such air will pass through the groove $e^{23}$ and will speedily equalize the pressure on both sides of the piston so that it will move no farther.

It will be understood of course that the movement of the piston and slide valve into restricted release position, shown in Fig. 5, is cushioned by contact of the extremity of the stem $e^9$ of the piston with a spring plunger $h$, the guide plate $h'$ of which is notched to permit the free travel of air from one side to the other. In normal position, the guide plate $h'$ rests against the end of the slide valve bushing $e^5$ and in such position a pin $h^2$ carried by the guide plate presses against the slide valve to hold it in its normal release position, as shown in Fig. 4.

Reference has been made to the passage of the air when the slide valve is in normal release position and it has been shown that under such conditions it is possible for the engineer to maintain in every brake cylinder of the train a pressure which, subject, of course, to the pressure at which the retaining valve is set, is less than that in the train pipe only by the pressure differential which is required to overcome and unseat the differential valve, and may therefore keep his brake set with a pressure which is known to him from the pressure in his equalizing reservoir $b$, even while he moves the handle $a^3$ of his controlling valve $a^2$ to full release position for the purpose of recharging the auxiliary reservoirs. (When the slide valve is in service position, the pressure is maintained, as above described, regardless of the retaining valves.) Furthermore the pressure which is thus maintained in the brake cylinders is uniform in all of the brake cylinders regardless of the length of the piston travel therein since it is dependent wholly upon the differential of the pressures in the train pipe and in the several brake cylinders. By reference to Fig. 5 it will be seen that should the engineer, in the movement of the engineer's valve handle to release position, admit excess pressure into the train pipe which, in an ordinary brake system, would result in release of the brakes on the forward cars in advance of those on the rear cars, the effect of such excess pressure, as far back in the train as it is effective in the train pipe, will be to move the piston $e^3$ and the slide valve $e^6$ beyond the normal release position, shown in Fig. 4, into the restricted release position, shown in Fig. 5, whereby the narrow extension $e^{18}$ of the recess or chamber $e^{17}$ in the slide valve overlaps the port $e^{19}$ and the escape of air from the corresponding brake cylinders is thereby reduced so that the release of these brakes is retarded somewhat, the brakes on the forward cars being therefore released not much if any in advance of the brakes on the cars in the rear and a more uniform release of the brakes throughout the entire train being thus effected. In this position of the parts of the auxiliary controlling valve the ports $e^{11}$ and $e^{12}$ of the slide valve are blanked so that there can be no passage of air through the differential valve $f'$. In Fig. 5 the needle valve $g$ is shown as open as might be the case temporarily by reason of the rush of air from the brake cylinders, but obviously the valve would quickly return to its seat. In either case this valve is inoperative in the restricted release position of the slide valve. In service position, as shown in Fig. 6, with the piston $e^3$ at the extreme right, all of the valve ports are blanked except the ports $e^{13}$ and $e^{19}$, which are placed in communication by the chamber or recess $e^{17}$ so that the air is then permitted to pass through the differential valve into the brake cylinder. The piston $e^3$, as will be understood, is normally returned from its left hand position to its right hand position by the pressure from the auxiliary reservoir $a^{11}$ which is admitted behind it through the connection $d^2$ and the port or channel $e^{21}$ so long as the port $e^{21}$ or its extension is in registration with the port with which the connection $d^2$ communicates. After such communication is cut off the movement of the piston is nevertheless continued by the air which is still admitted behind it from the supplemental reservoir $d^7$.

In the usual practice, after a service application of the brakes, the engineer turns his valve handle to lap position and holds it there as long as may be necessary, thus blanking all ports, and cutting off all communication from the source of supply of air pressure. Should the valve handle be left in lap position the train pipe pressure will gradually be dissipated by leakage. The efforts which have been made heretofore to compensate automatically for such leakage, so as to maintain the train pipe pressure, have not been successful for the reason that there was no provision for preventing the excess pressure in the main reservoir holding the regulating valve to its seat, which would result whether the diaphragm of the regulating valve was operated by a spring, as heretofore, or by the pressure in the equalizing reservoir. For this reason, therefore, the reducing valve $a^6$, which is of ordinary construction, is provided in the connection between the main reservoir and the automatic pressure controlling valve or equalizing valve, this reducing valve preventing the undesirable excess of pressure from reaching the check valve and therefore preventing the destruction of the pressure differential which is necessary to open the check valve and permit the regulating valve to operate. With this safeguard against the undesirable effect of excess of pressure the automatic controlling valve is always operative, regardless of the position of the engineer's valve, so that the pressure in the train pipe will be held automatically at the pressure which exists in the equalizing reservoir.

The usual exhaust of the ordinary triple valve is plugged, when the auxiliary controlling device is employed in connection therewith, and the retaining valve, if employed, is applied to the auxiliary device, so that the brake cylinder can exhaust only through the auxiliary device and then through the retaining valve. Therefore the kicking of the triple valve of one car or another into release position, which sometimes happens through the surging of the air in the train pipe, cannot effect the release of the brakes on that car, as heretofore, such action being prevented by the auxiliary device which maintains pressure in the brake cylinder. The usual retaining valve is not necessary to be used with the auxiliary device but it is desirable to retain it on account of the possible interchange of cars having the improved equipment with other systems which do not have it.

As stated hereinbefore, it is possible to apply the differential valve directly to the usual triple valve and such an arrangement is shown in Figs. 9–12. As the triple valve shown is of usual construction it will not be necessary to describe the same, except so far as parts thereof may be more or less directly involved in the application of the differential valve thereto. It is assumed that in Fig. 9 the parts are shown in service position, in which air from the train pipe $a^{4\times}$ passes by the check valve $i$ and thence through the chamber $k$, channel $k'$, port $l'$ of the slide valve $l$, recess or chamber $m'$ of the graduating valve $m$, port $l^2$ of the slide valve $l$, channel $k^2$ of the valve body and past the loosely fitting piston $n'$ into the chamber $n$ and thence to the brake cylinder through the connection indicated at $d^{3\times}$. The channel $k'$ communicates with a branch channel $k^3$ which in turn communicates with a branch channel $k^4$ through the medium of a differential valve $f'^{\times}$, which is held to its seat by a spring $f^{2\times}$ against the train pipe pressure to close the passage from the channel $k^3$ to the channel $k^4$, but opens when the train pipe pressure exceeds the pressure of the spring so as to admit the air from channel $k^3$ to channel $k^4$. Obviously so long as the train pipe pressure finds its way from the channel $k'$ through the port $l'$ and thence to the brake cylinder when the parts are in service position, there is no tendency to open the valve $f'^x$, but when the parts move into lap position and the passage through the port $l'$ is closed, the valve $f'^x$ will be opened by the train pipe pressure against the resistance of the spring $f^{2x}$. The channel $k^4$ therefore communicates in lap position through a port $l^3$ in the slide valve with the chamber or cavity $m'$ in the graduating valve and the air then finds its way through a port $l^2$ in the slide valve and a channel $k^2$ in the valve body past the loose piston $n'$ into the chamber $n$ and thence to the brake cylinder through the connection $d^{3x}$, whereby the pressure in the brake cylinder is maintained at a degree known to the engineer, through his control of the train pipe pressure from the equalizing reservoir, the train pipe pressure, which is thus admitted to the brake cylinder when the parts are in lap position, being less than the train pipe pressure by the resistance offered by the differential valve $f'^x$. It will therefore be seen that the differential valve may be incorporated in the structure of the ordinary triple valve, if so desired, and have its function of maintaining pressure in the brake cylinder even when the parts are moved to lap position, although as hereinbefore stated, it is preferable to embody the differential valve in the structure independent of the triple valve.

Various other embodiments of the invention will suggest themselves in view of the foregoing and it is to be understood, therefore, that the invention is not restricted to the precise constructions and arrangements shown and described herein and also that while the improved engine equipment and the improved car equipment are preferably combined in a single system, either one is capable of use independently of the other.

I claim as my invention:

1. In a fluid pressure brake system, the combination of a source of pressure, an equalizing reservoir connected with the source of pressure, a train pipe, a connection between the source of pressure and the train pipe including the engineer's valve, an independent connection between the source of pressure and the train pipe, a reducing valve included in said last named connection and means actuated by the differential of pressure in the equalizing reservoir and the train pipe for controlling the admission of pressure through said last named connection from the source of pressure to the train pipe.

2. In a fluid pressure brake system, the combination of a source of pressure, an engineer's valve, an equalizing reservoir connected with the source of pressure through the engineer's valve, a train pipe, a connection between the source of pressure and the train pipe including the engineer's valve, an independent connection between the source of pressure and the train pipe, a reducing valve included in said last named connection and means actuated by the differential of pressure in the equalizing reservoir and the train pipe for controlling the admission of pressure through said last named connection from the source of pressure to the train pipe.

3. In a fluid pressure brake system, the combination of a source of pressure, an engineer's valve, an equalizing reservoir connected with the source of pressure through the engineer's valve, a train pipe, a connection between the source of pressure and the train pipe including the engineer's valve, an independent connection between the source of pressure and the train pipe, a reducing valve included in said last named connection, a regulating valve to control communication through said last named connection between the source of pressure and the train pipe, and controlling means for said last named valve actuated by the differential of pressure in the equalizing reservoir and the train pipe.

4. In a fluid pressure brake system, the combination of a source of pressure, an equalizing reservoir connected with the source of pressure, a train pipe, a connection between the source of pressure and the train pipe including the engineer's valve, an independent connection between the source of pressure and the train pipe, a reducing valve included in said last named connection, a diaphragm subject on one side to the pressure in the equalizing reservoir and on the other side to the pressure in the train pipe and movable by a differential of such pressures, and means actuated by the movement of the diaphragm for controlling the admission of pressure through said last named connection from the source of pressure to the train pipe.

5. In a fluid pressure brake system, the combination of a source of pressure, an equalizing reservoir connected with the source of pressure, a train pipe, a connection between the source of pressure and the train pipe including the engineer's valve, an independent connection between the source of pressure and the train pipe, a reducing valve included in said last named connection, a diaphragm, a connection from the equalizing reservoir to the chamber on one side of the diaphragm, a connection from the train pipe to the chamber on the other side of said diaphragm, and means actuated by the movement of the diaphragm under the differential of said pressures to admit pressure through said last named connection from the source of pressure to the train pipe.

6. In a fluid pressure brake system, the combination of a source of pressure, an engineer's valve, an equalizing reservoir connected with the source of pressure through the engineer's valve, a train pipe, a connection between the source of pressure and the train pipe including the engineer's valve, an independent connection between the source of pressure and the train pipe, a reducing valve included in said last named connection, a diaphragm, a connection from the equalizing reservoir to the chamber on one side of the diaphragm, a connection from the train pipe to the chamber on the other side of said diaphragm, and means actuated by the movement of the diaphragm under the differential of said pressures to admit pressure through said last named connection from the source of pressure to the train pipe.

7. In a fluid pressure brake system, the combination of a source of pressure, an equalizing reservoir connected with the source of pressure, a train pipe, a connection between the source of pressure and the train pipe including the engineer's valve, an independent connection between the source of pressure and the train pipe, a reducing valve included in said last named connection, a regulating valve interposed in the said last named connection between the source of pressure and the train pipe, a diaphragm, a connection from the equalizing reservoir to the chamber at one side of the diaphragm, a connection from the train pipe to the chamber at the other side of said diaphragm, and means actuated by the movement of the diaphragm to control the movement of said regulating valve.

8. In a fluid pressure brake system, the combination of a source of pressure, an equalizing reservoir connected with the source of pressure, a train pipe, a connection from the source of pressure to the train pipe, a valve interposed in said connection, a piston connected with said valve and subject on one side to the pressure from the source of pressure, a connection on the other side of said piston to the train pipe, a regulating valve interposed in said last named connection, and a diaphragm subject on one side to the pressure in the train pipe and on the other side to the pressure in the equalizing reservoir and movable by a differential of said last named pressures to unseat said regulating valve.

9. In a fluid pressure brake system, the combination of a source of pressure, an equalizing reservoir connected with the source of pressure, a train pipe, a connection from the source of pressure to the train pipe, means subject to the pressure in the source of pressure to control the admission of pressure from the source of pressure to the train pipe, and other means subject to the differential of pressure in the equalizing reservoir and in the train pipe to control said first named means.

10. An automatic pressure controlling or equalizing valve provided with a connection for an equalizing reservoir and with connections to the source of pressure and to the train pipe and comprising means subject to the pressure in the source of pressure to control the admission of pressure from the source of pressure to the train pipe, and other means subject to the differential of pressure in the equalizing reservoir and in the train pipe to control said first-named means.

11. An automatic pressure controlling or equalizing valve provided with a connection for an equalizing reservoir and with connections to the source of pressure and to the train pipe and comprising a valve interposed in the connection between the source of pressure and the train pipe, a piston connected with said valve and subject on one side to the pressure from the source of pressure, a connection on the other side of said piston to the train pipe, a regulating valve interposed in such last named connection, and a diaphragm subject on one side to the pressure in the train pipe and on the other side to the pressure in the equalizing reservoir and movable by a differential of said last named pressures to unseat said regulating valve.

12. In a fluid pressure brake system, the combination of a source of pressure, a train pipe, an equalizing reservoir connected with the source of pressure, means to control the admission of pressure from the source of pressure to the train pipe, a chamber having a guide bearing, a diaphragm located in said chamber, a piston bearing for said diaphragm overlapping said guide bearing and dished to bear at its periphery against said guide bearing and to provide a full pressure area to said periphery, a connection from the train pipe to the chamber at one side of said diaphragm and a connection from the equalizing reservoir to the chamber at the other side of said diaphragm.

13. In a fluid pressure brake system, the combination of a source of pressure, an engineer's valve connected with the source of pressure, a train pipe connected with the engineer's valve, a connection from the source of pressure to the train pipe independent of the connection through the engineer's valve, and a reducing valve and a device for maintaining pressure in the train pipe interposed in said last named connection.

14. In a fluid pressure brake system, the combination of a source of pressure, an engineer's valve connected with the source of pressure, an equalizing reservoir connected with the source of pressure through the engineer's valve, a train pipe connected with the engineer's valve, a connection from the source of pressure to the train pipe independent of the connection through the engineer's valve, a reducing valve and a regulating valve interposed in said last named connection, and means subject to the pressure in the equalizing reservoir and in the train pipe for controlling said regulating valve.

15. In a fluid pressure brake system, the combination of a train pipe, a brake cylinder, a triple valve, a connection from the train pipe to the brake cylinder and a differential puppet valve interposed in said connection, said valve being subject to the pressure in the train pipe to open the same and subject to the pressure in the brake cylinder to close the same, whereby said valve is opened by a differential of said pressures.

16. In a fluid pressure brake system, the combination of a train pipe, a brake cylinder, a triple valve, a connection from the train pipe to the brake cylinder and a differential puppet valve interposed in said connection, said valve being subject to the pressure in the train pipe to open the same and subject to the pressure in the brake cylinder to close the same, said valve being provided with a spring to supplement the pressure in the brake cylinder to hold the valve closed, whereby the valve is opened by a differential of said pressures in excess of the spring pressure.

17. In a fluid pressure brake system, the combination of a train pipe, an auxiliary reservoir, a brake cylinder, a slide valve, means to move said slide valve, said means being subject on one side to the train pipe pressure and on the other side to the auxiliary reservoir pressure, a supplemental reservoir with connections to permit the pressure therein to act upon said means to supplement the pressure thereon from the auxiliary reservoir and means controlled by the slide valve to cut off the connection to the auxiliary reservoir after the movement of the slide valve has commenced.

18. In a fluid pressure brake system, the combination of a train pipe, an auxiliary reservoir, a brake cylinder, a slide valve, a piston to move said slide valve, a connection from the train pipe to the chamber at one side of said piston, a connection from the auxiliary reservoir to the chamber at the other side of said piston, a supplemental reservoir connected to said last named chamber and means controlled by the slide valve to cut off the connection to the auxiliary reservoir after the movement of the slide valve has commenced.

19. In a fluid pressure brake system, the combination of a train pipe, triple valve, a brake cylinder, a slide valve, means to move said slide valve, a connection from the train pipe to the brake cylinder controlled by said slide valve, and a differential valve interposed in said connection.

20. In a fluid pressure brake system, the combination of a train pipe, a brake cylinder, a slide valve, means subject to the pressure in the train pipe to move the slide valve, connections whereby pressure in the train pipe is admitted to the brake cylinder when the slide valve is in service position, and connections whereby pressure in the train pipe is admitted to the brake cylinder when the slide valve is in release position.

21. In a fluid pressure brake system, the combination of a train pipe, a brake cylinder, a slide valve, means subject to the pressure in the train pipe to move the slide valve, connections whereby pressure in the train pipe is admitted to the brake cylinder when the slide valve is in service position, connections whereby pressure in the train pipe is admitted to the brake cylinder when the slide valve is in release position, and a differential valve interposed in said last named connections whereby the pressure admitted to the brake cylinder is less than that in the train pipe.

22. In a fluid pressure brake system, the combination of a train pipe, a brake cylinder, a slide valve, means subject to the pressure in the train pipe to move the slide valve, a connection from the train pipe to the brake cylinder controlled by the slide valve, a needle valve to control said connection, a spring holding said needle valve normally to its seat, and a piston connected to said needle valve and subject to the back pressure in the brake cylinder to move said needle valve from its seat and open said connection.

23. In a fluid pressure brake system, the combination of a train pipe, a brake cylinder, a slide valve, means subject to the pressure in the train pipe to move the slide valve, a connection from the train pipe to the brake cylinder controlled by the slide valve, a needle valve to control said connection, a piston connected to said needle valve and subject to the back pressure in the brake cylinder to move said needle valve from its seat and open said connection, and a differential valve interposed in said connection.

24. In a fluid pressure brake system, the combination of a brake cylinder, a triple valve, a valve body having therein a piston chamber and a valve chamber, a piston in the piston chamber, a valve in the valve chamber and operatively connected with the piston, a train pipe communicating with the piston chamber at one side of the piston, an auxiliary reservoir communicating with the brake cylinder through the triple valve to supply pressure thereto and with the piston chamber on the opposite side of the piston, a supplemental reservoir also communicating with the piston chamber on the same side as the auxiliary reservoir and connections whereby communication with the auxiliary reservoir is cut off by the movement of the valve while the communication with the supplemental reservoir is continued and the movement of the piston and valve is continued without depleting the pressure in the auxiliary reservoir.

25. In a fluid pressure brake system, the combination of a brake cylinder, a triple valve, a valve body having therein a piston chamber and a valve chamber, a piston in the piston chamber, a valve in the valve chamber and operatively connected with the piston, a train pipe communicating with the piston chamber at one side of the piston, an auxiliary reservoir communicating with the brake cylinder through the triple valve to supply pressure thereto and with the piston chamber on the opposite side of the piston, a supplemental reservoir also communicating with the piston chamber on the same side as the auxiliary reservoir, connections whereby communication between the auxiliary reservoir and the supplemental reservoir is established and the pressures therein are equalized and means whereby the connections between the reservoirs are cut off during the movement of the valve, and the movement of the piston and valve is continued without depleting the pressure in the auxiliary reservoir.

26. In a fluid pressure brake system, the combination with a train pipe, auxiliary reservoir, brake cylinder and triple valve, of a valve body communicating directly with the train pipe and independently of the triple valve and provided with an exhaust channel, a slide valve and a piston for operating the slide valve, said slide valve having therein a recess or chamber adapted to establish communication between the brake cylinder and the exhaust channel, said recess or chamber having at one end a narrow extension whereby, when the slide valve is moved to its limit in one direction, the established communication between the brake cylinder and the exhaust cylinder is restricted by passage through said narrow extension.

27. In a fluid pressure brake system, the combination with a train pipe, auxiliary reservoir, brake cylinder and triple valve, of a valve body independent of and additional to the triple valve and having therein a valve chamber and a piston chamber, said piston chamber having an opening in one end with a surrounding annular seat and a leakage groove in its wall adjacent to said end, a piston movable in said piston chamber, a slide valve and a train pipe connection to the above mentioned end of the piston chamber independent of the train pipe connection to the triple valve, whereby as the piston is slightly unseated from said open end the pressure passing between the valve and its seat passes also through said leakage groove to the opposite side of the piston and equalizes the pressures on the opposite faces thereof.

28. In a fluid pressure brake system, the combination of a train pipe, a brake cylinder, a slide valve, means subject to the pressure in the train pipe to move the slide valve, a connection from the train pipe to the brake cylinder controlled by the slide valve, a needle valve to control said connection, a piston connected to said needle valve and subject to the back pressure in the brake cylinder to move said needle valve from its seat and open said connection, and a seat for said piston against which the piston is moved and held by the back pressure to prevent leakage beyond the piston.

This specification signed and witnessed this 16th day of July A. D., 1910.

WILLIAM H. SAUVAGE.

Signed in the presence of—
AMBROSE L. O'SHEA,
W. B. GREELEY.